United States Patent
Purvis et al.

(10) Patent No.: US 10,092,844 B2
(45) Date of Patent: Oct. 9, 2018

(54) GENERATION OF VISION RECOGNITION REFERENCES FROM USER SELECTED CONTENT

(71) Applicant: Disney Enterprises, Inc., Burbank, CA (US)

(72) Inventors: Christopher Purvis, Estacada, OR (US); Jonathan Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1318 days.

(21) Appl. No.: 13/854,831

(22) Filed: Apr. 1, 2013

(65) Prior Publication Data

US 2014/0295976 A1    Oct. 2, 2014

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 13/655 | (2014.01) |
| A63F 13/213 | (2014.01) |
| A63F 13/55 | (2014.01) |
| A63F 1/02 | (2006.01) |

(52) U.S. Cl.
CPC .......... *A63F 13/655* (2014.09); *A63F 13/213* (2014.09); *A63F 13/55* (2014.09); *A63F 2001/022* (2013.01); *A63F 2009/2414* (2013.01); *A63F 2300/206* (2013.01); *A63F 2300/208* (2013.01)

(58) Field of Classification Search
CPC ......... A63F 13/497; A63F 13/49; A63F 13/45
USPC ............................................. 463/40
See application file for complete search history.

(56) References Cited

U.S. PATENT DOCUMENTS

| | | | | |
|---|---|---|---|---|
| 5,212,368 A * | 5/1993 | Hara | ....... | G07F 17/32 235/375 |
| 6,468,162 B1 * | 10/2002 | Nakamura | ....... | G07F 17/32 463/23 |
| 7,326,118 B2 * | 2/2008 | Shinoda | ....... | G07F 17/32 463/1 |
| 8,584,931 B2 * | 11/2013 | Kim | ....... | G06Q 30/02 235/375 |

(Continued)

*Primary Examiner* — Milap Shah
*Assistant Examiner* — Jason Pinheiro
(74) *Attorney, Agent, or Firm* — Farjami & Farjami LLP

(57) ABSTRACT

There is provided a system and method for generation of vision recognition references from user-selected content. The method comprises receiving data corresponding to a user selected content, generating a vision recognition reference from the data, associating a game behavior descriptor with the vision recognition reference, wherein the game behavior descriptor correspond to a game behavior instance, and storing the vision recognition reference and the associated game behavior descriptor in a database, wherein the database includes a plurality of pre-defined vision recognition references, and wherein each of the plurality of pre-defined vision recognition references correspond to at least one pre-defined game behavior descriptor. The method may further comprise receiving user input corresponding to the user-selected content, retrieving the vision recognition reference and the associated game behavior descriptor from the database and initiating the game behavior in a corresponding game.

19 Claims, 6 Drawing Sheets

(56) References Cited

U.S. PATENT DOCUMENTS

| | | | |
|---|---|---|---|
| 9,027,832 B1* | 5/2015 | Rennard | G07F 17/329 235/380 |
| 9,731,208 B2* | 8/2017 | Bradbury | A63F 13/95 |
| 2005/0033599 A1* | 2/2005 | Frantz | G06Q 30/02 358/1.18 |
| 2005/0149849 A1* | 7/2005 | Graham | G06F 3/0481 715/230 |
| 2008/0250122 A1* | 10/2008 | Zsigmond | H04L 67/34 709/220 |
| 2012/0134651 A1* | 5/2012 | Cottrell | 386/278 |
| 2014/0179427 A1* | 6/2014 | Miura et al. | 463/31 |
| 2014/0179439 A1* | 6/2014 | Miura et al. | 463/42 |

* cited by examiner

GENERATION OF VISION RECOGNITION REFERENCES FROM USER SELECTED CONTENT

BACKGROUND

Public and private venues may provide interactive events that can further pull a user into an imaginative world. For example, audience members may attend an amusement park with a game attraction where individual audience members can interact with and participate in the game attraction. In one specific example, the audience member may present a card, picture, object, or other recognizable visual input device to an optical recognition system coupled to a game system. In response, the game attraction may change, display a corresponding game event, or cause some other interaction with the audience member. The audience member may collect a variety of these recognizable objects/devices and use them to participate in a wide variety of interactions. Further, the audience member may present identification, such as a bar code or RFID tag, which allows the attraction to associate the particular instance of the attraction with the audience member. This may cause the attraction to respond to the audience member based on parameters specific to that audience member, such as usage history or player class. While audience members may choose the method of presentation of the visual input, the user is typically relegated to a limited, pre-defined set of inputs (for example, images on cards published by the attraction operator) and corresponding effects. A user may wish to present a more personalized image and obtain a corresponding effect. Thus, the user may wish to create their own visual image and choose what effect that image may have when used at the attraction.

SUMMARY

The present disclosure is directed to the generation of vision recognition references from user selected content, substantially as shown in and/or described with at least one of the figures, as set forth more completely in the claims.

DETAILED DESCRIPTION

Figure 1A:
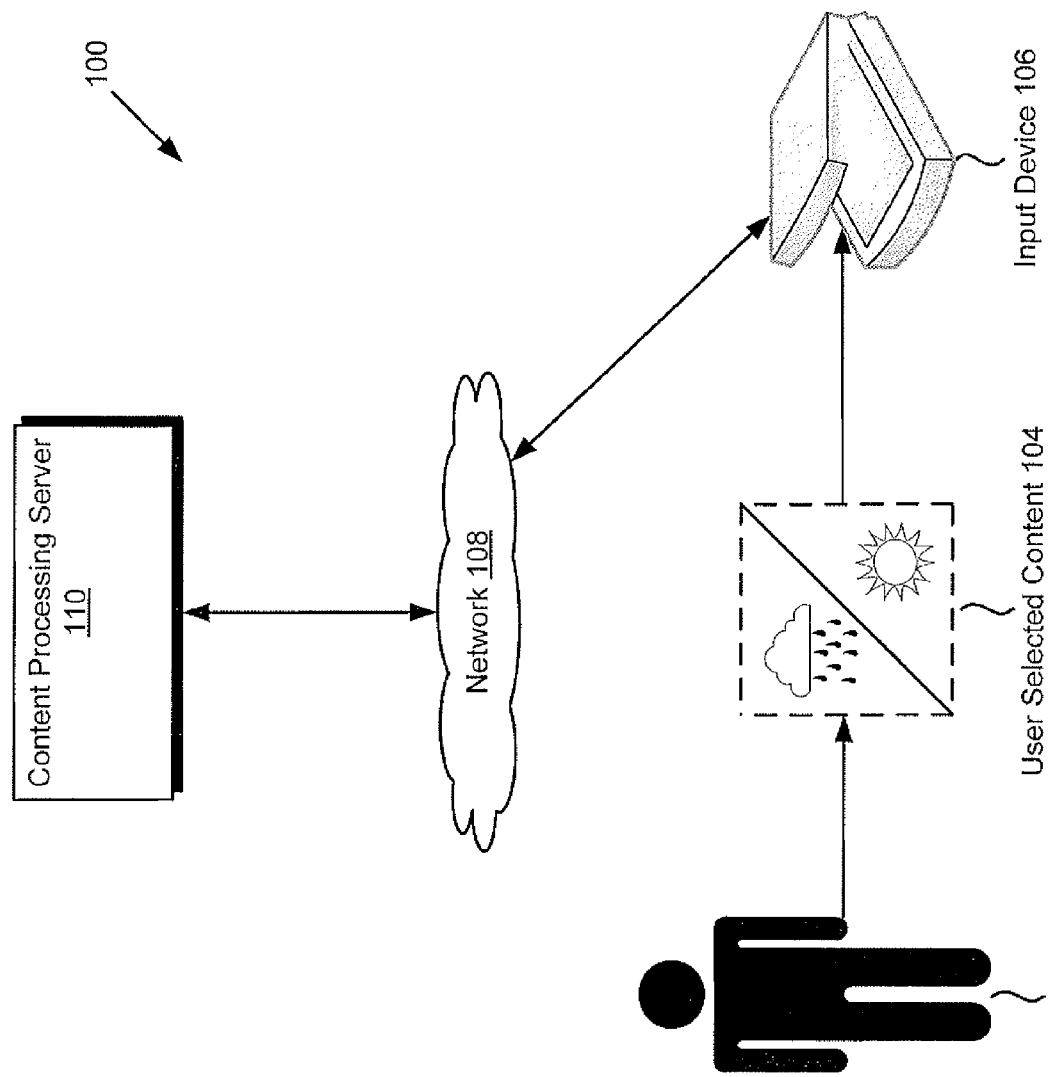
FIG. 1A presents an exemplary diagram of a system environment for generation of vision recognition references from user selected content.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary diagram of a system environment for generation of vision recognition references from user selected content. As shown in FIG. 1, system environment 100 shows user 102 having chosen user selected content 104. User 102 may then enter user-selected content 104 into input device 106. Input device 106 then transfers user-selected content 104 to content processing server 110 over network 108.

User 102 may correspond to some member of the general public interested in attending and interacting with a game, attraction, and/or show, such as at an amusement park or audience show. The game, attraction, and/or show may include visual input devices corresponding to specific events that may occur. For example, an amusement park game may include a collectable card game, where cards in the collectable card game act as visual input devices to the game. Thus, when a card is presented to a visual recognition unit coupled to the game, a responsive event may occur.

However, user 102 may wish to utilize user-selected content 104 as a visual input in a game, attraction, and/or show. User selected content 104 may correspond to a drawn picture, a photograph, a computer generated graphic, an object or product, or other visual representation. Without prior input and recognition of user selected content 104, a game system will not identify a corresponding event with user selected content 104. In accordance with this implementation of the present invention, user selected content 104 is uploaded, a vision recognition reference corresponding to user selected content 104 is generated, and game behavior instances, such as a game behavior, image, animation, audiovisual content, attraction event and/or show event parameters, are attached to user selected content 104.

To do so, user 102 uses input device 106 to input and upload user selected content 104 to content processing server 110 over network 108. Although input device 106 is shown as a scanner in FIG. 1, input device 106 may correspond to other input devices, such as a camera, a mobile phone, a personal computer or laptop computer, or other input devices.

Input device 106 may be in communication with content processing server 110 over network 108. Network 108 may be implemented by any available network technology, such as a wired or wireless communication network, broadband network, or other network capable of sending and receiving data.

Content processing server 110 functions to create a user-specific or user-agnostic visual recognition reference from user selected content 104, and associate the visual recognition reference with user created content 104. Tools for modification of the user selected content, such as a webpage for customizing user selected content 104, saving user selected content 104, creating user data and/or profiles corresponding to user 102 and/or user selected content 104, or other customizing features, may be contained within content processing server 110, or may be provided separately to user 102 in the form of software for platforms such as a personal computer or mobile device.

Although FIG. 1A shows user 102 utilizing input device 106 to upload user created content 104, in another implementation, user 102 may use input device 106 to draw and/or create user created content 104 using a graphical design application on content processing server 110.

Content processing server 110 may further associate game behavior instances such as instructions, commands, or events that are relevant to a game with the visual recognition reference. User 102 may select these instances prior to or during uploading user selected content 104, or at some other time and/or location, such as at a game system or venue. In addition to game behavior instances, content processing server 110 may receive additional information from user 102, such as a user profile, account, or identifier used to associate user 102 with user created content 104.

Figure 1B:
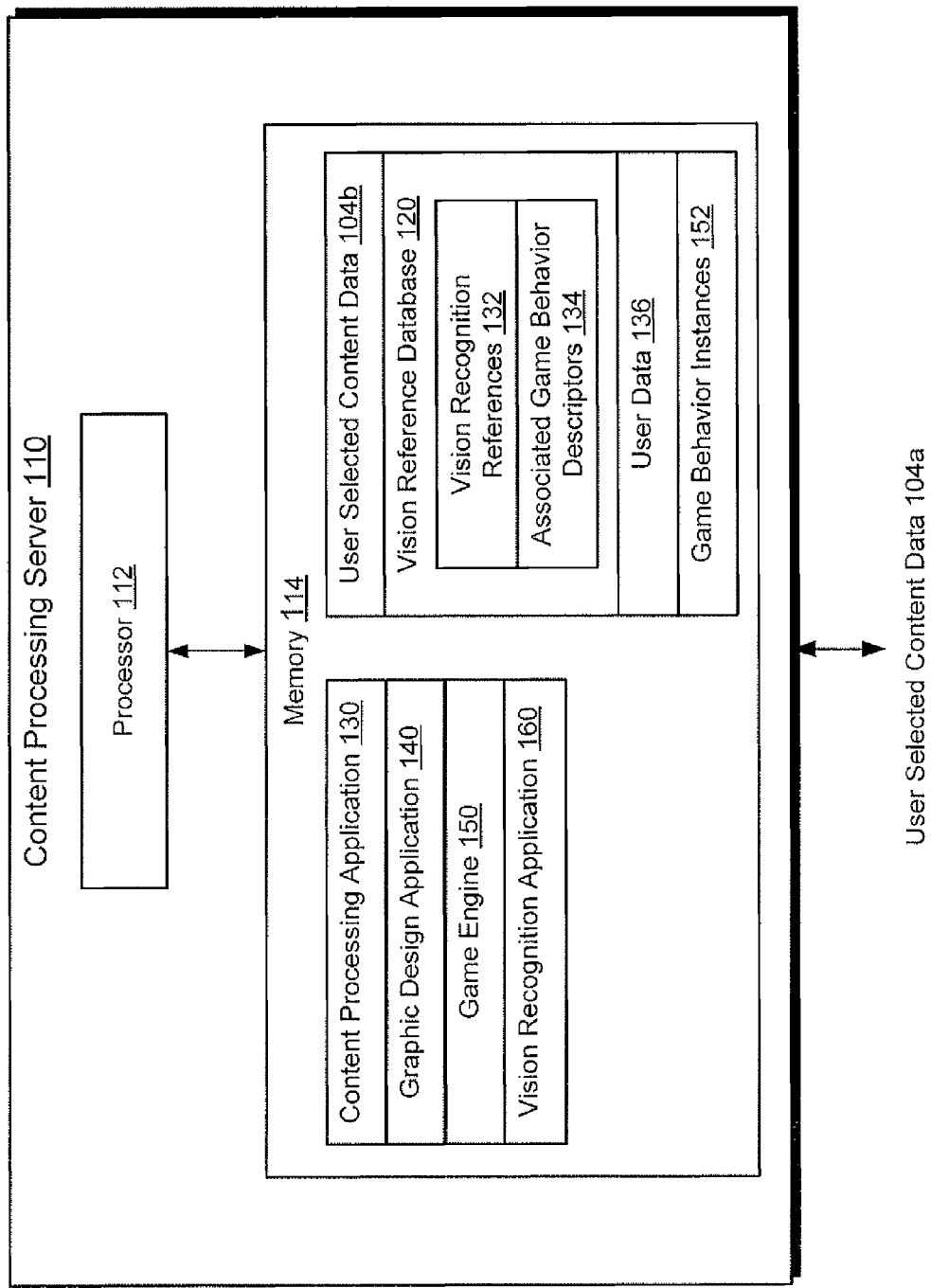
FIG. 1B presents an exemplary server for generation of vision recognition references from user-selected content.

FIG. 1B presents an exemplary server for generation of vision recognition references from user-selected content. Content processing server 110 receives user selected content data 104*a*, for example over network 108 of FIG. 1A. Content processing server 110 includes processor 112 in communication with memory 114. Memory 114 includes user selected content data 104*b* corresponding generally to user selected content 104*a*, vision reference database having visual recognition references 132 and associated game behavior descriptors 134, user data 136, and game behavior instances 152. Memory 114 further contains content processing application 130, graphic design application 140, game engine 150, and vision recognition application 160. Although content processing server 110 is shown as a single entity, content processing server 110 may be implemented on a single computing environment such as a server, or in multiple computing environments such as two or more network connected servers.

Processor 112 of content processing server 110 is configured to access memory 114 to store received input and/or to execute commands, processes, or programs stored in memory 114. Processor 112 receives user selected content data 104*a* and stores the data in memory 114 as user selected content data 104*b*. Processor 112 may also access memory 114 and execute programs, processes, and modules stored in memory 114, such as content processing application 130, graphic design application 140, game engine 150, and/or vision recognition application 160. Processor 112 may store and access in memory 114 data from programs, processes and modules, such as vision reference database containing vision recognition references 132 and associated game behavior descriptors 134, user data 136, and/or game behavior instances 152. Processor 112 may be implemented by one or more devices, such as a microprocessor, microcontroller or similar hardware processing device, or a plurality of hardware devices.

Memory 114 of content processing server 110 corresponds to a memory capable of storing commands, processes, and programs for execution by processor 112. Memory 114 may be implemented as ROM, RAM, flash memory, or another sufficient memory unit for storages of processes and data necessary for content processing server 110. Although memory 114 is shown as integrated with content processing server 110, in other implementations, memory 114 may be separate but connectable to content processing server 110.

In some implementations, content processing server 110 implements a content creation process, such as graphic design application 140, that functions to create and render a user selected content. Graphic design application 140 may correspond to a computer graphical design application. In such an implementation, user selected content data 104*a* may correspond to instructions, commands, and/or other data used within graphic design application 140. In other implementations, a user may upload user selected content data 104*a*, such as a photograph, content created in a client side application, or other user-selected content. Thus, user selected content data 104*a* may correspond to a reference image of an object. The user may also modify uploaded user selected content data 104*a* using graphic design application 140. User selected content data 104*b* may correspond to the same data from user selected content data 104*a*, or may correspond to an iteration containing a variation of user selected content data 104*a*, such as after manipulation using graphic design application 140.

Content processing server 110 utilizes user selected content data 104*b* with content processing application 130. Content processing application 130 may implement processes, routines, or modules that operate to analyze user selected content data 104*b* to obtain a vision recognition reference. Content processing application 130 may contain visual recognition processes operable of identifying visual patterns, sections, or images contained within user selected content data 104*b* and creating a vision recognition references. The vision recognition reference may then be stored in vision recognition references 132 of vision reference database 120. Vision recognition references 132 correspond to a plurality of vision recognition references associated with a visual input, such as a user selected content. Thus, vision recognition references 132 may include pre-defined vision recognition references from pre-determined content as well as vision recognition references from processed user selected content data 104*b* using content processing application 130. The pre-determined content may include one or more previously processed images recognizable by a visual recognition device. Thus, the pre-determined content may correspond to widely available images or images that may be distributed to a plurality of users, for example purchasable cards with images in a collectable trading card game.

Content processing application 130 may include means to choose one or more associated game behavior descriptors corresponding to one or more game behavior instances 152 executable in a game environment, venue attraction and/or show. A user may select a "sunlight" game behavior descriptor or a "rain" game behavior descriptor when uploading and saving user selected content data 104*b*. Content processing application 130 may store this data in vision reference database 120 as associated game behavior descriptors 134. Associated game behavior descriptors may include pre-defined game behavior descriptors associated with pre-defined vision references as well as game behavior descriptors associated with vision recognition references from processed user selected content data 104*b*. When an image with the user selected content is later presented at a visual recognition device, vision reference database may retrieve the vision recognition reference and associated game behavior descriptors to cause one or more corresponding game behavior instances 152 to occur, such as causing sunlight or rain in the game environment, venue attraction, and/or show.

Game behavior instances 152 may correspond generally to responsive actions that may be initiated in game engine 150. Game engine 150 may correspond to a set of instructions for initiating and playing a game for a user. Game behavior instances 152 may correspond to presenting an image, presenting an animation, changing a game state, playing a turn, attacking a game character, defending a game character, incrementing a value of a parameter associated with an in-game character, and/or decrementing a value of a parameter associated with an in-game character in game engine 150. Game behavior instances 152 may correspond to further responsive actions in game engine 150 and may be configured or updated based on user interactions with game engine 150.

Content processing server 110 may further receive and store user identification data as user data 136. User data 136 may include user profiles and/or accounts, user information, identifiers, or other user data. In certain implementations a user may possess an identifying number, card, code, RFID tag, or other identifier. User data 136 may be associated with specific user vision recognition references in vision recognition references 132.

Content processing server 110 contains vision recognition application 160, which may be utilized to receive a user input corresponding to user selected content data 104b. After receiving the user input, vision recognition application 160 may access vision recognition references 132 and associated game behavior descriptors 134 to retrieve the corresponding vision recognition reference and associated game behavior descriptor. Then, game engine 150 may initiate one or more of game behavior instances 152 corresponding to the associated game behavior descriptors. Additionally, when the user input is displayed, identification information stored in user data 136 may also be presented at the visual recognition device in order to assist vision recognition application 160 in access the correct data in vision recognition references 132 and associated game behavior descriptors 134.

Figure 2:
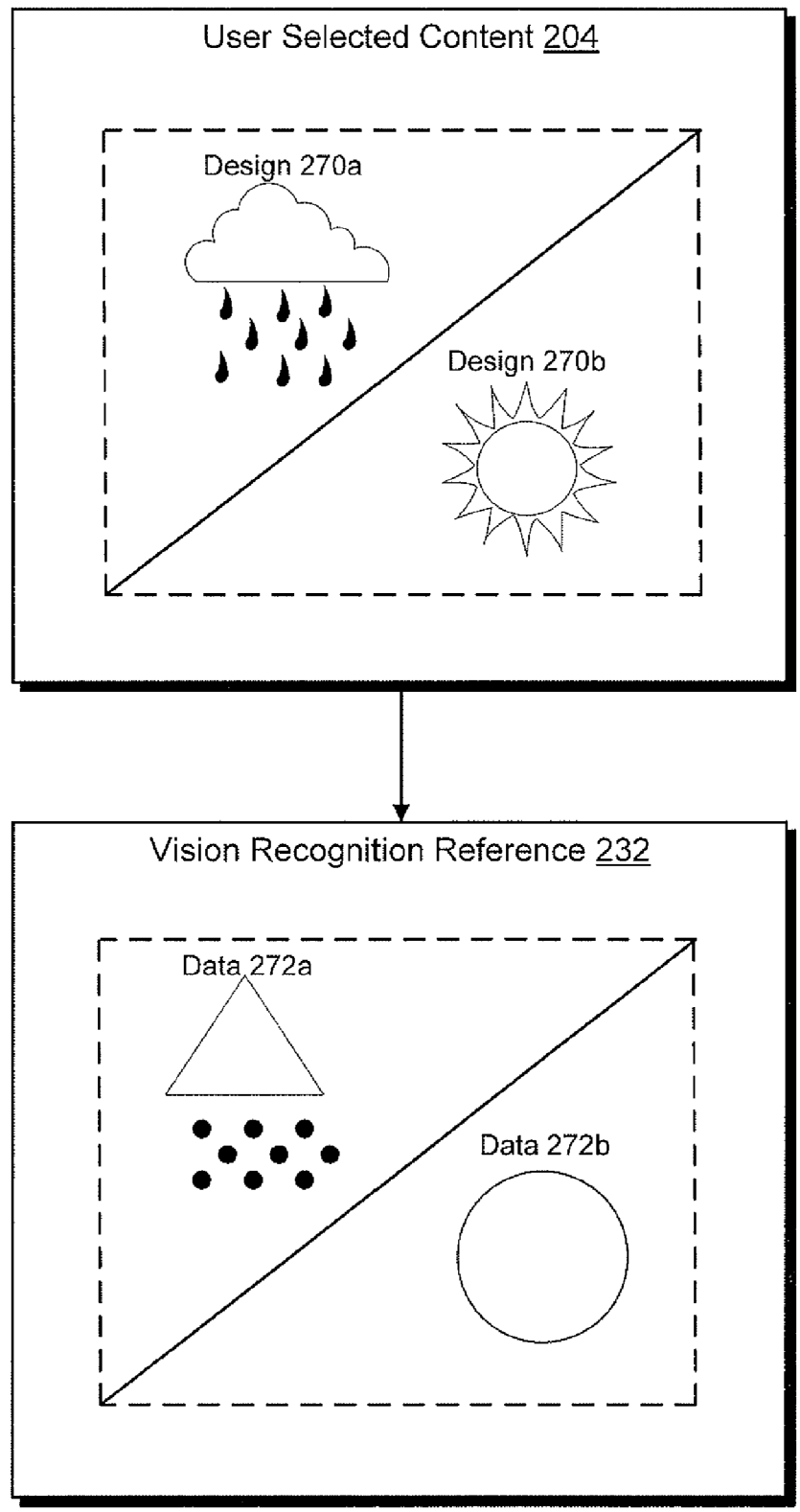
FIG. 2 shows an exemplary user selected content and vision recognition references generated from the user-selected content.

FIG. 2 shows an exemplary user selected content and vision recognition references generated from the user-selected content. User selected content 204 contains design 270a and 270b while vision recognition reference 232 contains data 272a and data 272b. User selected content 204 may be processed into vision recognition reference 334.

User selected content 204 may correspond to a drawing, picture, or other design created by a user and uploaded to a content processing server. As previously discussed, user selected content 204 may be hand drawing by the user, computer generated using a graphic design process or program, include a photograph taken by the user, or another visual image. User selected content 204 includes design 270a and design 270b. Design 270a and design 270b may correspond to visual representation recognizable by a content processing application. When the content processing application analyzes user created content 204, the content processing application can recognize all or parts of design 270a and design 270b.

Vision recognition reference 234 may be created based on design 270a and design 270b of user created content 204. The content processing application may recognize all of parts of design 270a and design 270b of user selected content 204 and generate vision recognition reference 334 having data 272a and data 272b. Data 272a and data 272b may correspond to processed design 270a and design 270b suitable for a vision recognition reference. Thus, the processing may include adjustments to contrast, color depth, color intensity, rotation, image pixel resolution, cropping, dividing design 270a and design 270b into two or more sub-images for further processing, or other necessary processing. In addition to modifying a contrast, a color depth, a color intensity, a rotation, a resolution, a cropping, and a dividing, of design 270a and design 270b in user selected content 204, a content processing application may add a digital watermark to user selected content 204. Data 272a and data 272b may capture as fine a level of granularity as specified by the system. As shown in FIG. 2, data 272a and data 272b show adjusted design 270a and design 270b respectively, possibly accounting for image shape and/or pixel resolution.

Once vision recognition reference 234 is generated, all or part of the data may be associated with game behavior instances or other user-selected parameters. Vision recognition reference 234 and associated game behaviors may be transmitted to a game system. The game behavior instances may be recalled when a representation of user created content 204 is presented to a vision recognition unit of the game system and identified using vision recognition reference 234.

Figure 3A:
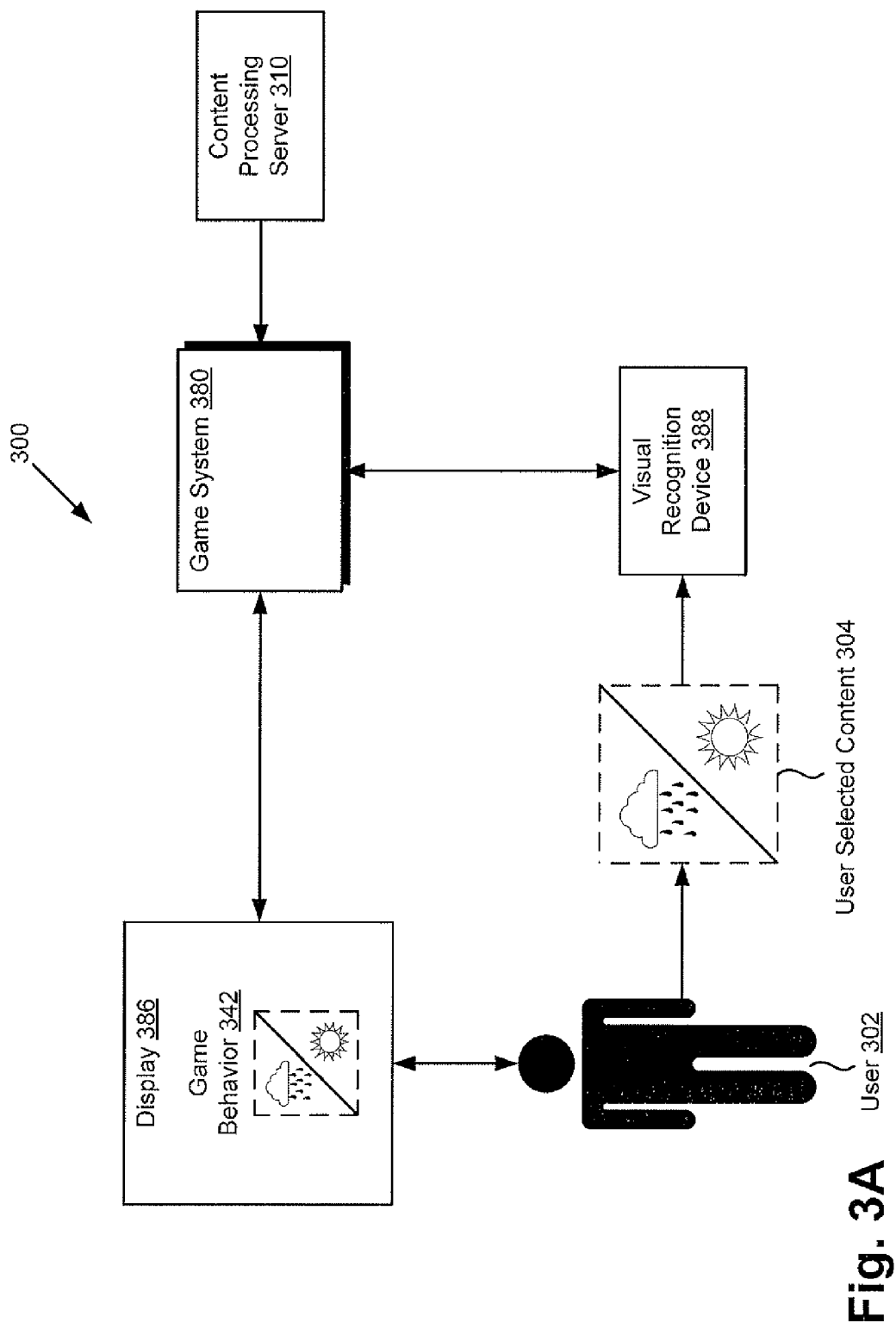
FIG. 3A shown an exemplary diagram of a system environment for presentation of game behaviors associated with vision recognition references.

FIG. 3A shown an exemplary diagram of a system environment for presentation of game behaviors associated with vision recognition references. Game environment 300 shows user 302 presenting user selected content 304 to visual recognition device 388. Visual recognition device 388 is in contact with game system 380, which utilizes display 386 for output of game behavior instance 342 in a game. Game system 380 is in communication with content processing server 310 either directly or using a network connection. Content processing server 310 corresponds generally to content processing server 110 from FIG. 1A, and communicates data to game system 380. Thus, game system 380 may receive at least vision recognition references and associated game behavior descriptors corresponding to user selected content 304.

In operation, user 302 utilizes game system 380 after uploading user selected content 304. User 302 presents user selected content 304 to visual recognition device 388. Visual recognition device 388 may correspond to a camera, scanner, or other visual recognition unit usable to receive user created content 304. User created content 304 may correspond to user created content 104 of FIG. 1A. User 302 may present the same drawing, picture, or photograph as user created content 104 in system environment 100. However, in other implementations, user 302 may copy, print, or reprint the visually recognizable device from user created content 104 of FIG. 1A onto a new medium, such as a playing card, paper, article of clothing, or other medium.

Game system 380 recognizes user selected content 304 using a vision recognition reference. Game system 380 may the retrieve associated game behavior descriptors using the vision recognition reference. The associated game behavior descriptors may be chosen by user 302 previously and correspond to game behavior instance 342. Game behavior instance 342 may correspond to an event in a game user 302 can play. For example, the game may be an interactive game on a video display, such as a video game, or may correspond to a game environment at a venue, such as a theme park attraction.

Game behavior instance 342 may include a visual, audio, or other presentation in the game, attraction, and/or show. Game behavior instance 342 may cause some effect during the game, attraction, and/or show. For example, game behavior instance 342 may cause rain or sunshine to display on display 386. Game behavior instance 342 may be user-specific and may adjust based on other user profile parameters, such as number of times user selected content 304 has been presented to game system 380, upgrades user 302 has purchased or obtained for user selected content 304, or other user parameters. User 302 may view game behavior instance 342 on display 386. Display 386 may be any suitable means for outputting and rendering the game with game behavior instance 342, such as a television, a radio, a computer display, a mobile telephone, or a gaming console, for example.

Figure 3B:
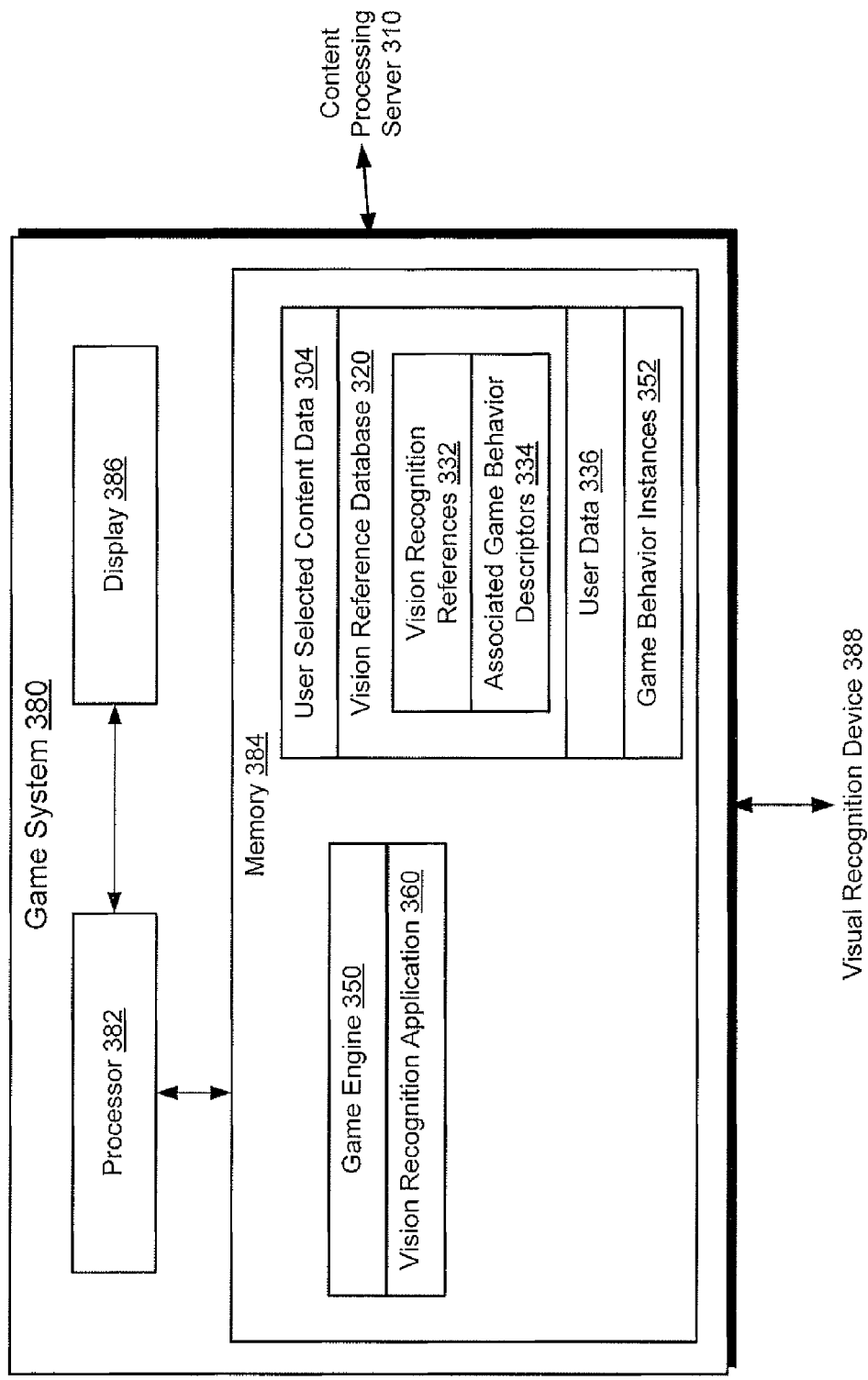
FIG. 3B presents an exemplary game system for presentation of game behaviors associated with vision recognition references.

Moving to FIG. 3B, FIG. 3B presents an exemplary game system for presentation of game behaviors associated with vision recognition references. Game system 380 is in communication with content processing server 310 in order to receive and store data. Game system 380 includes processor 382 in communication with memory 384. Memory 384 includes user selected content data 304, vision reference database having visual recognition references 332 and associated game behavior descriptors 334, user data 336, and game behavior instances 352. Memory 384 further contains game engine 350 and vision recognition application 360. Processor 382 is connected to display 386 for output and/or rendering game engine 350. Additionally, game system 380 is connected to visual recognition device 388. Although game system 380 is shown as a single entity, game system 380 may be implemented on a single computing environment such as a server, or in multiple computing environments such as two or more network connected servers.

Game system 380 receives data from content processing server 310. For example, game system 380 may receive user selected content data 304, vision reference database 320 having visual recognition references 332 and associated game behavior descriptors 334, and user data 336 from content processing server 310. User selected content data 304, vision reference database 320 having visual recognition references 332 and associated game behavior descriptors 334, and user data 336 may correspond generally to user selected content data 104b, vision reference database 320 having visual recognition references 132 and associated game behavior descriptors 134, and user data 136, respectively, of FIG. 1B.

Processor 382 and memory 384 may share similar hardware implementations as those described above in reference to processor 112 and memory 114, respectively, of FIG. 1B. Visual recognition device 388 may correspond generally to visual recognition device 388 of FIG. 3A. Game system 380 may operate to display a game using game engine 350 on display 386. A user may view the game and/or interact with the game. Further, a user may present a user selected content device, image, or other representation corresponding to user selected content data 304 to visual recognition device 388. Game system 380 may then utilize vision recognition application 360 to retrieve vision recognition references 332 and associated game behavior descriptors 334. Once associated game behavior descriptors 344 is retrieved, corresponding game behaviors 352 may be initiated using game engine 350. Processor 382 may utilize game engine 350 and game behaviors 352 to initiate the game behavior and/or responsive action in the game on display 386. Thus, a user may utilize the user-selected content to cause a corresponding effect in a game.

Figure 4:
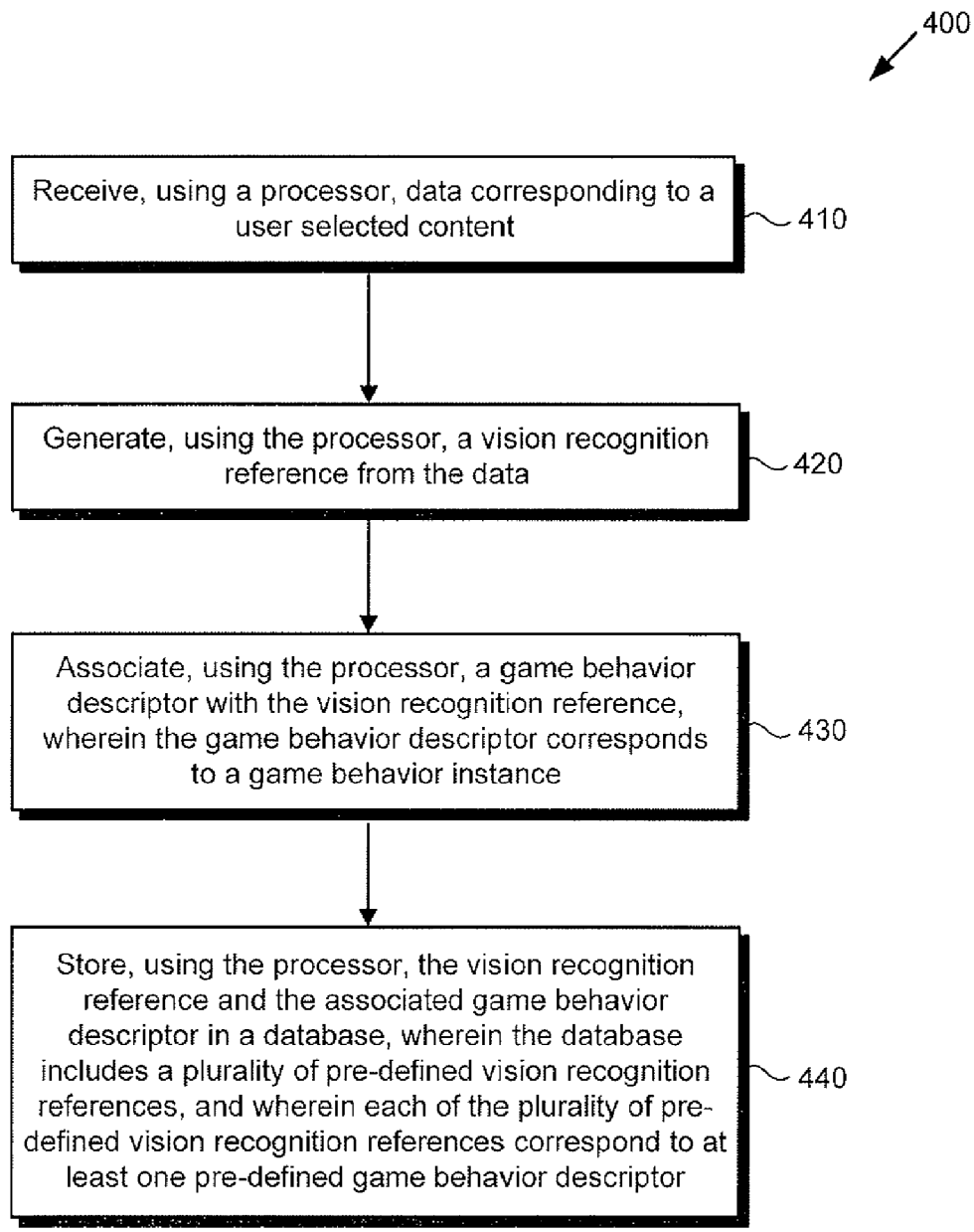
FIG. 4 presents an exemplary flowchart illustrating a method for generation of vision recognition references from user-selected content.

FIG. 4, presents flowchart 400 illustrating a method for generation of vision recognition references from user selected content.

At operation 410, data 104a corresponding to user selected content 104/204/304 is received, for example, by processor 112 of content processing server 110/310. User selected content 104/204/304 may correspond to an upload, such as a photograph, computer generated image, drawing, or other user upload. User selected content 104/204/304 may also correspond to a computer graphic generated using graphic design application 140. Processor 112 may receive user selected content data 104a corresponding to user selected content 104/204/304 and store in memory 114 of content processing server 110/210/310 as user selected content 104b.

At operation 420, a vision recognition reference 132/232/332 is generated from the data 104a, for example, by processor 112 of content processing server 110/310. Content processing application 130 of content processing server 110/310 generates a vision recognition reference 132/232/332 by processing user selected content data 104b. Content processing application 130 may alter a visual appearance of user selected content 104/204/304 to make user selected content 104/204/304 more suitable for visual recognition device 388. In other implementations, content processing application 130 may add a watermark, bar code, identification number, or other identifying data to user selected content 104/304.

At operation 430, a game behavior descriptor 134/334 is associated with the vision recognition reference 132/232/332, for example by processor 112 of content processing server 110/210/310, wherein the game behavior descriptor 134/234 corresponds to a game behavior instance 152/352. User 102/302 may select a game behavior descriptor 134/334 corresponding to at least one game behavior instance 152/352 for use with game engine 150/350. The selection may be done by the user of content processing application 130, such as through menu selection, user input, or other application selection means.

At operation 440, the vision recognition reference 132/232/332 and the associated game behavior descriptor 134/334 are stored in a database 120/320, for example, by processor 112 of content processing server 110/210/310, wherein the database includes a plurality of pre-defined vision recognition references 132/232/332, and wherein each of the plurality of pre-defined vision recognition references 132/232/332 correspond to at least one pre-defined game behavior descriptor 134/334. Thus, the vision recognition reference 132/232/332 and associated game behavior descriptor 134/334 may be stored in vision reference database 120/320 with pre-defined vision recognition references 132/232/332 and pre-defined game behavior descriptors 134/334.

Vision recognition references may be created and stored from user-selected content. This allows a visual recognition system where a user may associate other data with user selected content. The system may be utilized with games, attractions, and shows to provide a customized experience desirable to users and conducive to repeat visits.

Various techniques can be used for implementing the concepts described in the present application without departing from the scope of those concepts. While the concepts have been described with specific reference to certain implementations, a person of ordinary skill in the art would recognize that changes can be made in form and detail without departing from the scope of those concepts. The described implementations are illustrative and not restrictive. The present application is not limited to the implementations described herein, but many rearrangements, modifications, and substitutions are possible without departing from the scope of the present disclosure.

What is claimed is:

1. A method for use by a game system including a processor in communication with a visual recognition device, the method comprising:
   receiving, by the processor, data corresponding to a user selected content;
   generating, by the processor, a vision recognition reference from the data;
   associating, by the processor, a user selected game behavior descriptor with the vision recognition reference, wherein the game behavior descriptor corresponds to a game behavior instance;
   storing, by the processor, the vision recognition reference and the associated game behavior descriptor in a database, wherein the database includes a plurality of pre-defined vision recognition references, and wherein each of the plurality of pre-defined vision recognition references corresponds to at least one pre-defined game behavior descriptor;

receiving, after the storing, an image captured by the visual recognition device corresponding to a displayed image presented by a user during playing a game;

matching the image captured by the visual recognition device with the vision recognition reference;

retrieving, in response to the matching, the associated game behavior descriptor associated with vision recognition reference from the database; and performing in the game, in response to the receiving of the image, the game behavior instance corresponding to the associated game behavior descriptor.

2. The method of claim 1, wherein the game behavior instance is one of presenting an image, presenting an animation, changing a game state, playing a turn, attacking a game character, defending a game character, incrementing a value of a parameter associated with an in-game character, and decrementing a value of a parameter associated with an in-game character.

3. The method of claim 1, wherein the vision recognition reference is an augmented version of the user selected content based on image recognition patterns.

4. The method of claim 3, wherein the generating the vision recognition reference includes modifying one of a contrast, a color depth, a color intensity, a rotation, a resolution, a cropping, and a dividing, of the user selected content.

5. The method of claim 3, wherein generating the vision recognition reference includes adding a digital watermark to the user selected content.

6. The method of claim 1, wherein the user selected content is received from one of a server side graphic design application and a client side user upload.

7. The method of claim 1, wherein the user-selected content is a digital photograph.

8. The method of claim 1, wherein the visual recognition device includes at least one of a camera and a scanner for capturing the image.

9. The method of claim 8 further comprising:
updating, using the processor, the game behavior descriptor based on the corresponding game.

10. The method of claim 1, wherein the data received from the user is a visual representation data corresponding to the user selected content.

11. A system comprising:
a server accessible over a communication network, the server including a processor and a memory;
a content recognition process stored in the memory;
a visual recognition device including at least one of a camera and a scanner;
the content recognition process, under the control of the processor, configured to:
receive data corresponding to a user-selected content;
generate a vision recognition reference from the data;
associate a user selected game behavior descriptor with the vision recognition reference, wherein the game behavior descriptor corresponds to a game behavior instance;
store the vision recognition reference and the associated game behavior descriptor in a database, wherein the database includes a plurality of pre-defined vision recognition references, and wherein each of the plurality of pre-defined vision recognition references correspond to at least one pre-defined game behavior descriptor;
a game engine configured to:
receive, after storing, an image captured by the visual recognition device corresponding to a displayed image presented by a user during playing a game;
match the image captured by the visual recognition device with the vision recognition reference;
retrieve, in response to matching, the associated game behavior descriptor associated with vision recognition reference from the database; and
performing in the game, in response to receiving the image, the game behavior instance corresponding to the associated game behavior descriptor.

12. The system of claim 11, wherein the game behavior instance is one of presenting an image, presenting an animation, changing a game state, playing a turn, attacking a game character, defending a game character, incrementing a value of a parameter associated with an in-game character, and decrementing a value of a parameter associated with an in-game character.

13. The system of claim 11, wherein the vision recognition reference is an augmented version of the user selected content based on image recognition patterns.

14. The system of claim 13, wherein the generating the vision recognition reference includes modifying one of a contrast, a color depth, a color intensity, a rotation, a resolution, a cropping, and a dividing, of the user selected content.

15. The system of claim 13, wherein generating the vision recognition reference includes adding a digital watermark to the user selected content.

16. The system of claim 15, wherein the displayed image presented by the user is one of a card and an article of clothing containing the user selected content.

17. The system of claim 11, wherein the user selected content is received from one of a server side graphic design application and a client side user upload.

18. The system of claim 11, wherein the content recognition process is further configured to: update the game behavior descriptor based on the corresponding game.

19. The system of claim 11, wherein the data received from the user is a visual representation data corresponding to the user selected content.

* * * * *